United States Patent
Halfen

(10) Patent No.: US 10,635,357 B2
(45) Date of Patent: Apr. 28, 2020

(54) METHOD FOR OVERLAPPING MEMORY ACCESSES

(71) Applicant: Nvidia Corporation, Santa Clara, CA (US)

(72) Inventor: Michael Halfen, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 16/205,390

(22) Filed: Nov. 30, 2018

(65) Prior Publication Data

US 2020/0012453 A1    Jan. 9, 2020

Related U.S. Application Data

(60) Provisional application No. 62/693,526, filed on Jul. 3, 2018.

(51) Int. Cl.
  *G06F 3/06* (2006.01)
  *G06F 13/16* (2006.01)

(52) U.S. Cl.
  CPC .......... *G06F 3/0659* (2013.01); *G06F 3/0611* (2013.01); *G06F 3/0673* (2013.01); *G06F 13/1668* (2013.01); *G06F 2213/16* (2013.01)

(58) Field of Classification Search
  CPC .. G06F 3/0659; G06F 13/1668; G06F 3/0673; G06F 3/0611; G06F 2213/16
  See application file for complete search history.

(56) References Cited

U.S. PATENT DOCUMENTS

| | | |
|---|---|---|
| 5,636,173 A | 6/1997 | Schaefer |
| 6,446,158 B1 | 9/2002 | Karabatsos |
| 6,879,540 B2 | 4/2005 | Maruyama et al. |
| 7,031,221 B2 | 4/2006 | Mooney et al. |
| 7,221,617 B2 | 5/2007 | Flacy et al. |
| 7,502,252 B2 | 3/2009 | Fuji et al. |
| 7,542,322 B2 | 6/2009 | McCall et al. |
| 7,911,824 B2 | 3/2011 | Kawai et al. |
| 8,180,939 B2 | 5/2012 | Kim et al. |
| 8,243,546 B2 | 8/2012 | Warren |
| 8,325,525 B2 | 12/2012 | Mao et al. |
| 9,971,518 B2 | 5/2018 | Gillingham et al. |
| 2002/0134994 A1 | 9/2002 | Krause et al. |
| 2003/0217243 A1 | 11/2003 | Chang |
| 2008/0137472 A1 | 6/2008 | Schnell et al. |
| 2018/0102151 A1 | 4/2018 | Kim et al. |
| 2018/0293026 A1* | 10/2018 | Hsieh ................. G06F 3/0659 |
| 2018/0293190 A1* | 10/2018 | Jang .................. G06F 13/1689 |
| 2018/0374533 A1* | 12/2018 | Liu .................. G11C 11/40618 |

* cited by examiner

*Primary Examiner* — Mohammed A Bashar

(57) ABSTRACT

Improved methods and systems for accessing a memory in a computer are disclosed. In one embodiment, the true and complement portions of a differential write clock signal are employed as two single ended clock signals for independently controlling different memory chips in a memory system. For example, in a memory system having two memory chips, one memory chip is configured to use the true write clock signal and the other memory chip is configured to use the complement write clock signal. Employing the differential write clock signal as two single ended clock signals allows overlapping of write and read operations across multiple memory chips, reducing the time needed for accessing memory. Accordingly, the disclosed methods and systems provide a more efficient memory system that can be used to improve the operation of a computer.

20 Claims, 3 Drawing Sheets

METHOD FOR OVERLAPPING MEMORY ACCESSES

CROSS-REFERENCE TO RELATED APPLICATION

This application claims the benefit of U.S. Provisional Application No. 62/693,526, filed on Jul. 3, 2018, and entitled "METHOD FOR OVERLAPPING MEMORY ACCESSES," which is incorporated herein in its entirety by reference.

TECHNICAL FIELD

This application is directed, in general, to memory systems and, more specifically, to increasing the performance of memory systems by reducing the access time when switching between different memory chips of a memory system.

BACKGROUND

Memory systems often include multiple memory chips that are connected to and controlled by a single memory controller. Some memory systems are referred to as memory packages that include memory chips having multiple memory banks, wherein each of the memory banks of a memory chip share a common input/output bus. A single memory controller can be used to direct the memory operations of the multiple memory chips of a memory package.

Improvements in the processing performance and power efficiency of memory systems are being driven by the various computer applications being developed. Memory systems are key in new data intensive applications, such as virtual reality (VR) and augmented reality (AR), cloud computing, and artificial intelligence. These and other applications desire improvements in memory access that include a higher bandwidth, increased speed, and, of course, lower power.

SUMMARY

In one aspect, the disclosure provides a method of operating a memory having multiple memory chips. In one embodiment the method includes: (1) employing a differential write clock signal as two single ended clock signals that are a first write clock signal and a second write clock signal, (2) controlling read and write operations of a first memory chip of the memory employing the first write clock signal, and (3) controlling, independently from the controlling of the first memory chip, read and write operations of a second memory chip of the memory employing the second write clock signal.

In another aspect, an integrated circuit is disclosed. In one embodiment the integrated circuit includes: (1) a double data rate (DDR) dynamic random access memory (DRAM) including a first memory rank and a second memory rank that share a bus for commands and share other buses for communicating data, and (2) a memory controller configured to independently control read and write operations of the first memory rank and the second memory rank employing a true signal and a complement signal of a differential write clock signal as single ended clock signals.

BRIEF DESCRIPTION

Reference is now made to the following descriptions taken in conjunction with the accompanying drawings, in which.

DETAILED DESCRIPTION

Figure 1:
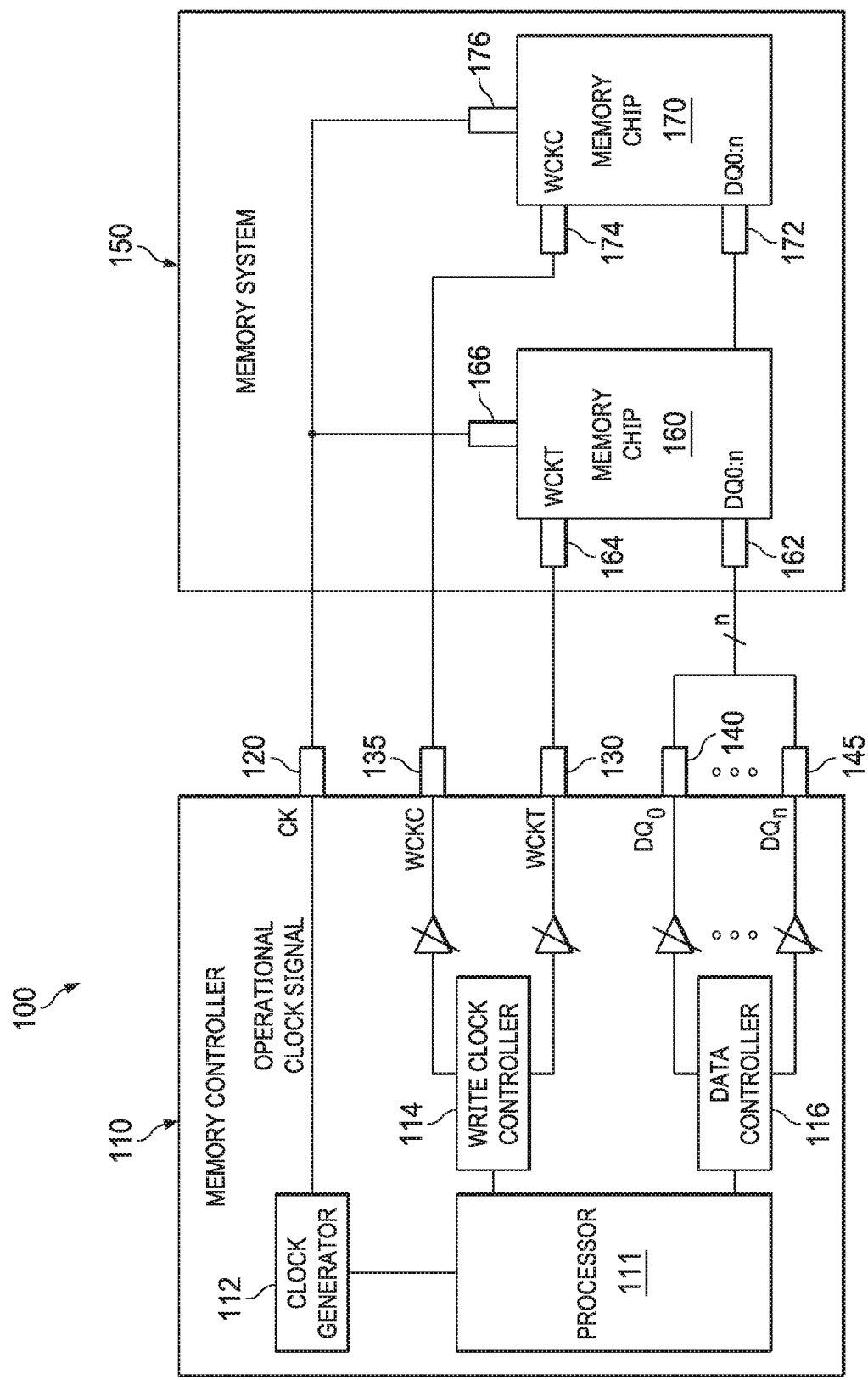
FIG. 1 illustrates a block diagram of an example of a memory system configured to operate according to the principles of the disclosure.

In addition to improvements in bandwidth, speed, and power, memory systems having a smaller footprint are also desired. One way to achieve a smaller footprint is reducing the number of buses or traces that are needed and minimizing the number of pins that are required. Sharing buses and pins, however, can lower access speed to the different memory chips when switching from one memory chip to another memory chip. This can be due to each of the memory chips having a separate clock input that requires synchronization before reading or writing to the memory chip.

For example, dynamic random access memory (DRAM) is one type of memory that is used in the various memory systems of the applications noted above. The DRAM memory systems can include memory ranks and can be one of the various generations of double data rate (DDR) DRAM, including the low power DDR (LPDDR) DRAMs. A memory rank is a set of DRAM chips that are connected to and controlled by the same memory controller and that share data pins.

An interface protocol is usually employed for the memory ranks to manage switching between read and write operations on the different DRAM chips. A synching operation is an example of an interface protocol that includes sending a write clock postamble to a first DRAM rank at the end of its write clock signal and then sending a write clock preamble to a second DRAM rank to enable the write clock signal.

An alternative to sending the preamble after completion of the postamble is to simultaneously perform a synching operation with both DRAM ranks. This, however, requires each DRAM rank to keep its receiver and internal clocking for the write clock signal active while in an unused state; resulting in increased power use for the memory rank. Nevertheless, not overlapping the write clock preamble and postamble to each DRAM rank increases the rank turnaround time and reduces system performance or increases system power.

Accordingly, the disclosure provides a method of accessing memory chips of a memory system, such as DRAM ranks of a memory package, that reduces the access switching time needed when switching between the different memory chips. Access switching time is the number of cycles between a read or write data burst for a first memory chip to a read or write data burst for a second memory chip. For memory ranks, access switching time is the rank turnaround time, which is also referred to in the industry as rank-to-rank turnaround time. In addition to reducing the access switching time, the disclosed method and system also employ less power than continually keeping the receiver and clocking active for the write clock signal. Instead, the write clock signal can be activated to a memory chip only when a read or write operation will be performed at the memory chip. Thus, the required power for the memory system can be reduced.

The disclosed method advantageously employs the true and complement of a differential write clock signal as single ended clock signals that are each independently employed by different memory chips. Considering a memory rank having two DRAM ranks, one DRAM rank is configured to use the true write clock signal and the other DRAM rank is configured to use the complement write clock signal of a differential signal in a single-ended operation. Employing the differential write clock signal as single ended clock signals allows overlapping of write clock signal operations across multiple ranks. For example, a synchronization command, or synch command, of a synchronization operation can be sent to a DRAM rank while a memory operation, i.e., a read or write operation, is in progress to another DRAM rank.

The disclosure provides an improvement in accessing memory that optimizes memory chip to memory chip turns (e.g., rank to rank turns). The disclosed configurations and operations of a memory system provide improvements by utilizing memory busses more efficiently. Additional improvements are also provided by increasing performance (memory accesses) per power used (watts).

Turning now to the figures, FIG. 1 illustrates a block diagram of an example of an integrated circuit (IC) 100 constructed according to the principles of the disclosure. The IC 100 can be used in various devices, such as mobile computing devices. The IC 100 includes a memory controller 110 and a memory system 150 having a first memory chip 160 and a second memory chip 170. The memory controller 110 is configured to retrieve data from the memory system 150 for processing and send data to the memory system 150 for storage. The memory controller 110 includes a processor 111, a clock generator 112, a write clock controller 114, and a data controller 116.

The memory controller 110 can be a system on chip (SOC), such as, a Tegra® processor from NVIDIA Corporation of Santa Clara, Calif. The memory controller 110 can also be another type of an electronic component or integrated circuit, such as, other components or circuits that lack a central processing unit (CPU) but have memory interfaces. Some examples include an integrated circuit such as an application-specific integrated circuit (ASIC) and a field-programmable gate array (FPGA).

The processor 111 directs the operation of the memory controller 110 and processes data stored in the memory system 150. The memory controller 110 can have multiple processors, such as a CPU and a graphics processing unit (GPU). The clock generator 112 provides an operational clock signal (CK) on a CK pin 120 for operating the memory system 150 and controlling the first and second memory chips 160, 170. The operational clock signal is used for all address, command, and control input signals for the memory system 150. For example, command and address (CA) signals for the memory system 150 are referenced to the operational clock signal. The operational clock signal can be a differential clock signal.

The write clock controller 114 controls the write clock signal for reading from and writing to the different memory chips, the first memory chip 160 and the second memory chip 170. A true (WCKT) and complement (WCKC) of the write clock signal are provided to WCKT pin 130 and WCKC pin 135, respectively. The write clock signal can be a higher frequency clock than the operational clock signal and is employed to drive data.

The data controller 116 sends data to and receives data from the first memory chip 160 and the second memory chip 170 over data buses connected to 0 to n data pins, represented by data pins 140 and 145 in FIG. 1. The number of data pins can vary depending on, for example, the architecture of the memory controller 110 or another type of memory controller. In some examples, n is eight. A data mask inversion (DMI) signal can also be communicated with the data. A DMI pin can be used with the data pins.

The memory controller 110 can include additional pins typically included to communicate with a memory system, such as chip select pins used to inform each memory chip when it should take inputs from a signal line, and a command interface (CA) pin for communicating address, capture commands, write commands, etc. The memory controller 110 can also include additional components, such as those typically included with a SOC. The additional components can include a power supply, communication busses, memory, etc.

As noted above, the memory system 150 includes the first memory chip 160 and the second memory chip 170. In some examples, the first memory chip 160 and the second memory chip 170 can be in different memory packages. Additionally, the memory controller 110 can be communicatively coupled to multiple memory packages. The memory system 150 can be a memory package, such as a DRAM memory package wherein the first and second memory chips 160, 170, can be DRAM ranks. In various embodiments, the memory system 150 can be a DDR or a LPDDR, such as a fifth generation LPDDR.

Figure 4:
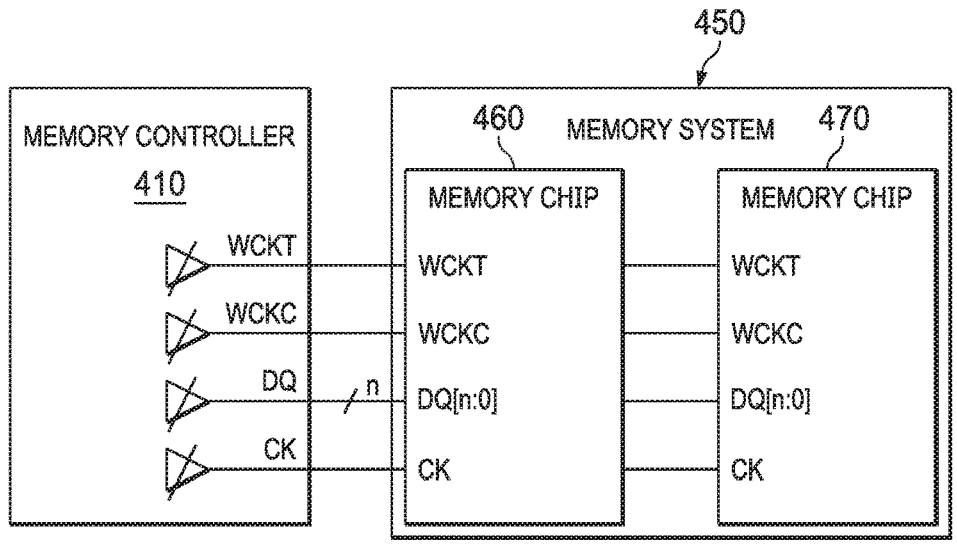
FIG. 4 illustrates a block diagram of an example of an integrated circuit (IC) as disclosed herein that can also be configured to use a differential write clock (WCK) as single ended write clock signals.

The first memory chip 160 and the second memory chip 170 include data pins that are coupled to the same data busses from the memory controller 110. Data pin 162 and data pin 172 are illustrated to represent the data pins for each of the memory chips 160, 170. The first memory chip 160 and the second memory chip 170 also have pins that receive a write clock signal and the operational clock signal. The first memory chip 160 has a WCKT pin 164 that receives the write clock true signal (WCKT) from the memory controller 110 and the second memory chip 170 has a WCKC pin 174 that receives the write clock complement signal (WCKC) from the memory controller 110. The memory chips 160, 170, can also operate by receiving the write clock signal as a differential clock signal in another embodiment. Thus, the memory chips 160, 170, can operate employing a write clock signal as a differential signal or as two single ended signals depending on the configuration. The memory chips 160, 170, can include logic circuitry that determines how to use the write clock signals when received as a differential pair. FIG. 4 provides an example of such an embodiment. The first memory chip 160 and the second memory chip 170 include CK pins 166, 176, for receiving the operational clock signal from the memory controller 110.

By employing the differential write clock signal as single ended signals, the access switching time when switching between memory operations on the two different memory chips 160, 170, is reduced. For example, employing the single ended write clock signals prevents bubble cycles resulting from synching operations. A bubble cycle is a DQ bus (data bus) cycle in which data is not transferred to or from the memory. Instead, the access time can be limited to a delay that corresponds to process corner variations. With single ended signals, write clock operations can overlap across the different memory chips 160, 170, for a lower access switching time.

Employing the write clock signal as single ended signals can also reduce the need for levelling. For example, if the memory chips 160, 170, have to be trimmed separately due to skew issues with the write clock signal, then the same trim setting for both memory chips 160, 170, does not work, and the internal trim setting has to be changed before sending the write clock signal to the memory chips 160, 170, to ensure timing specifications are met. However, with the write clock signal being employed as a single ended signal, then the trim can be individually tailored for a particular one of the memory chips 160, 170, and levelling between the memory chips 160, 170, is not necessary.

Figure 2:
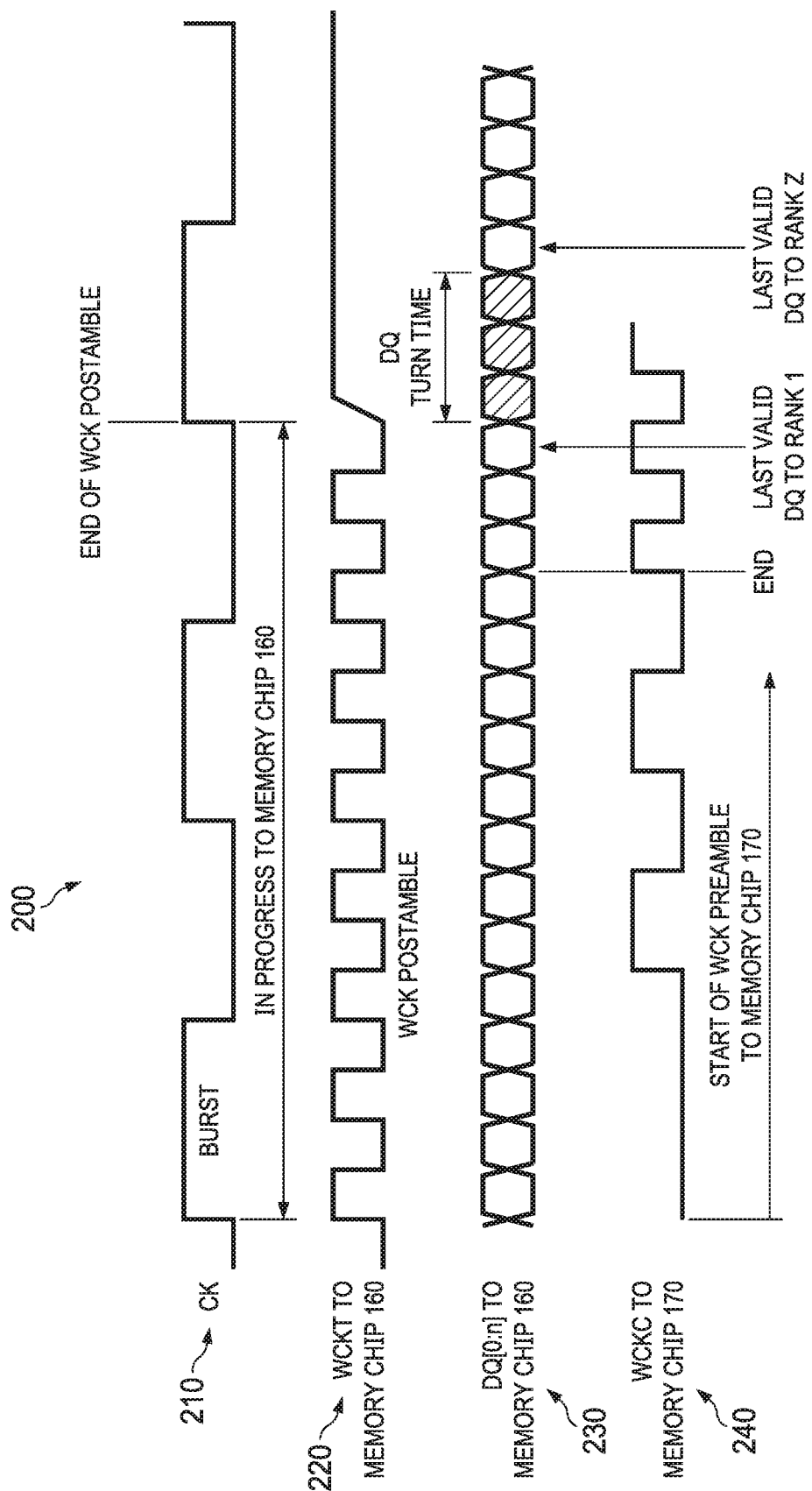
FIG. 2 illustrates timing diagrams corresponding to the buses of the memory system of FIG. 1 when switching between accessing the different memory chips of the memory system.

FIG. 2 illustrates timing diagrams 200 corresponding to the buses between the memory controller 110 and the memory system 100 when operating the memory system 150 with single ended write clock signals. The waveforms of FIG. 2 illustrate the advantage of employing the write clock signal as single ended signals when switching from accessing the memory chip 160 to accessing the memory chip 170. Some command signals, including chip select (CS) commands and address commands, such as column address strobe (CAS) commands, are not represented by waveforms in FIG. 2 but are used when switching and are mentioned below.

Prior to accessing a memory chip, an activation step is performed that includes sending a signal with the row address over the command bus. A CAS command is then sent on the command bus that starts the preamble alignment for the write clock signal, and includes a column address with either a read or write command. After alignment, data then arrives at the memory chip over the data bus. For accessing the next chip, the same sequence is followed. The various commands can be sent serially over the command bus, and since it can be shared between at least two memory chips, the commands are spaced apart to prevent overlapping on the command bus.

Overlapping of data from the different memory chips on the data bus needs to be prevented, also. This can be done via a synching operation. As noted above, the CAS command includes the synch operation for the write clock signal. The synch operation involves sending a write clock preamble and postamble. The memory chip has an internal write clock divider to align an internal write clock with the high frequency write clock signal. The preamble tells the internal divider of the memory chip which clock to use for performing the read or write operation. The preamble can operate with the divider to align phases.

The preamble can be a multicycle pattern that does not normally overlap with either a write clock signal or a write clock postamble in an active system. Because of the pattern, the synch operation for the write clock signal cannot overlap in time with a data burst on the data bus since this involves a full rate toggle. This can be prevented in a couple of ways. One way is to turn on the write clock receiver/clocking to both of the memory chips, such as memory chips 160, 170. This however, results in an increase in power to the memory system 150 since both memory chips 160, 170, will consume extra power for their receiver and add internal clocking on their write clock distribution and dividers.

Another way is to send the full postamble to a first memory chip followed by then sending the full preamble to a second memory chip. This, however, introduces many clocks of idle bubbles on the data bus. The waveforms of FIG. 2 illustrate using the write clock signal as a single ended signal that allows overlapping of the preamble and the postamble to different memory chips in the write clock signal synch operation.

FIG. 2 includes four waveforms: 210 for the operational clock signal CK, 220 for the write clock true signal (WCKT), 230 for the data lines zero to n (0-n), and 240 for the write clock complement signal (WCKC). The waveforms represent the example of switching a memory operation to memory chip 170 from memory chip 160. The operational clock signal CK represented by waveform 210 in FIG. 2 is provided to both memory chip 160 and memory chip 170 as illustrated in FIG. 1.

To begin accessing the memory chip 170, CS is set and a command is sent that includes the column and row address, and either read or write (not shown is FIG. 2). A faster clock, the write clock signal, is also desired for memory chip 170 to drive the data busses (or lines) at a higher clock rate than the operational clock signal CK. The timing relationship between the write clock signal and the operational clock signal CK, however, has to be met. So synching of the write clock signal with the operational clock for the memory chip 170 begins by sending the preamble to the memory chip 170 as shown in waveform 240.

A memory operation is happening with memory chip 160 as illustrated in waveform 230 by a data burst across the data lines 0-n. During the memory operation, the write clock true signal WCKT with the postamble is being applied to the memory chip 160 as indicated by waveform 220.

To switch access from the memory chip 160 to the memory chip 170, a preamble for a synch operation is sent to memory chip 170 as indicated by waveform 240. Advantageously, the preamble can be sent to memory chip 170 during the data burst with memory chip 160, while the postamble is being sent to memory chip 160 as shown in waveform 220. As such, the preamble can be sent to memory chip 170 prior to or in parallel with sending the postamble to memory chip 160.

After the completion of the preamble to memory chip 170 (on waveform 240), switching the data burst on the data bus to memory chip 170 begins. In this example, there is no relationship between the postamble to memory chip 160 and the start of data to memory chip 170. As such, the data operation to memory chip 170 is completely independent of the waveform 220 and the postamble to memory chip 160 is independent of activity to memory chip 170. The access time required between the switching on the data bus is indicated by the crosshatching in waveform 230. Typically, the data bursts between the two memory chips 160, 170, are not aligned to account for process corner variations of, for example, the memory chips. Data output from a DRAM during a read has a specified range of potential response timings due to internal clocking variation dependent on the process corner. Similarly for writes, the data output from a SOC is delayed to match the variation on the clocking to the DRAM's internal capture flops (also specified as an expected range). A delay between the switching data bursts can be controlled by the memory controller 110 to account for these or other manufacturing variations. Since the preamble to memory chip 170 is already completed, the access time can be equal to the delay to account for variations. In some examples, the gap or access time between the bursts can be two write clock cycles.

The waveforms of FIG. 2 illustrate the advantageous overlapping of the synching operation that reduces the accessing time. Additionally, since a single ended signal is used, leveling requirements are reduced since the memory chip 160 can be leveled with the write clock true signal WCKT and the memory chip 170 can be leveled with the write clock complement signal WCKC. Thus, when changing memory operations between the memory chips 160, 170, timing of the write clock signal does not have to be changed. Furthermore, power loading is reduced since the higher frequency write clock signal can be provided to each memory chip when needed instead of continually provided.

Figure 3:
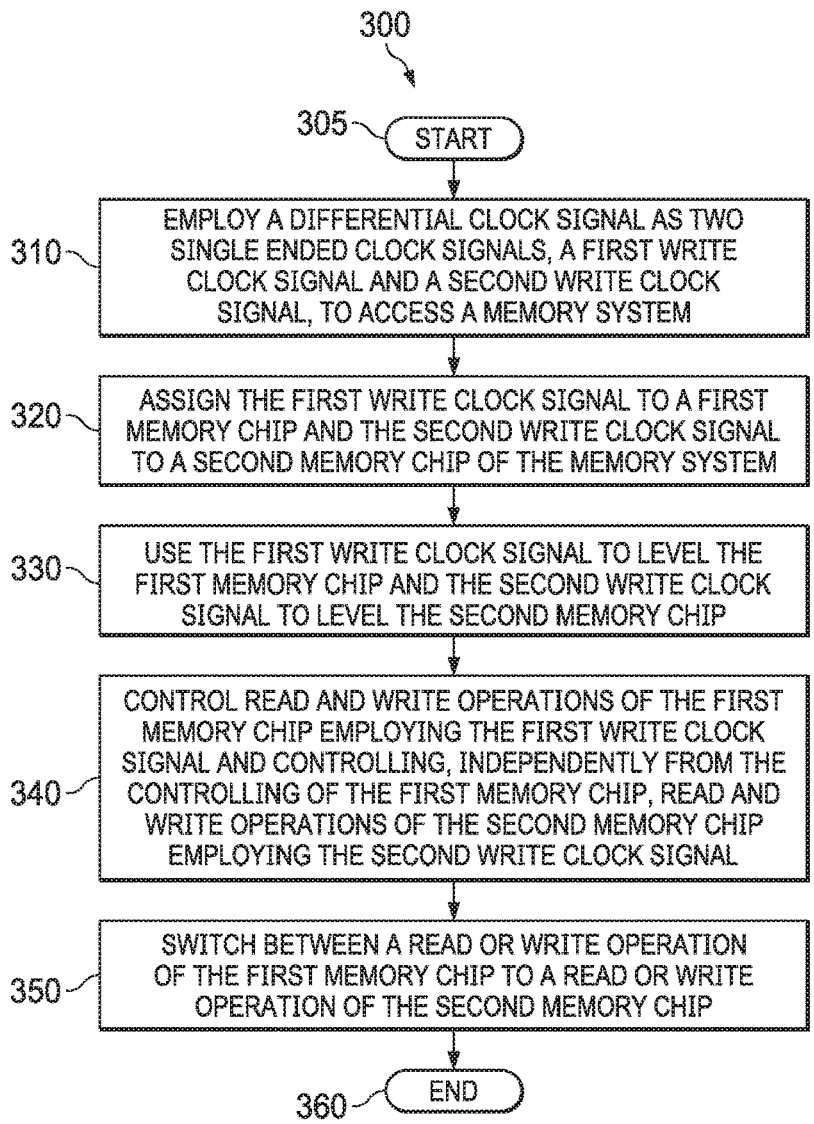
FIG. 3 illustrates a flow diagram of an example method 300 of operating a memory system carried out according to the principles of the disclosure.

FIG. 3 illustrates a flow diagram of an example method 300 of operating a memory system carried out according to the principles of the disclosure. The method 300 can be used with a memory system such as memory system 150 of FIG. 1. An SOC or another device can be used to access the memory system. The method 300 begins in a step 305.

In a step 310, a differential write clock signal is employed as two single ended clock signals for accessing a memory system. The two single ended clock signals are a first write clock signal and a second write clock signal.

In a step 320, the first write clock signal is assigned to a first memory chip and the second write clock signal is assigned to a second memory chip of the memory system. The memory system can be a DDR or an LPDDR, and the first and second memory chips can be DRAM ranks.

In a step 330, the first write clock signal is used to level the first memory chip and the second write clock signal is used to independently level the second memory chip. Since single ended signals are used, leveling requirements are reduced.

The method 300 continues in step 340 by controlling read and write operations of the first memory chip employing the first write clock signal and controlling, independently from the controlling of the first memory chip, read and write operations of the second memory chip employing the second write clock signal.

In a step 350, a read or write operation of the first memory chip is switched to a read or write operation of the second memory chip. The switching between access of the memory chips can include synching the second write clock signal by sending a preamble signal while the read or write operation on the first memory chip is in progress. The preamble signal can be a multi-cycle pattern that is incompatible on a bus with the first or second write clock signal. The switching can further include sending a postamble signal with the first write clock signal while sending the preamble signal. In one example, the switching is completed after completion of the preamble signal and the postamble signal. Additionally a delay time can also be included to cover for process corner variations and other variables. The delay time can be two cycles of the first or second write clock signals. Thus, the access time can advantageously equal the delay time. The method 300 continues to step 360 and ends.

The disclosure provides examples of using single ended write clock signals for two memory chips. One skilled in the art will understand that the principle can be applied to more than two memory chips. For example, if there are more than two memory chips, some of the memory chips can be configured for a write clock true signal and the remaining memory chips can be configured to use the write clock complement signal. Switching between "true" memory chips and "complement" memory chips can then be performed as described herein by sending the preamble and the postamble in parallel. Additionally, two of the memory chips can be operated as disclosed herein and the remaining memory chips can be operated via conventional means. The two memory chips or even groups of "true" and "complement" chips can be selected and connected for operation based on different criteria, such as loading or priority.

FIG. 4 illustrates a block diagram of an example of an IC 400 as disclosed herein that can also be configured to use a differential write clock (WCK) as single ended write clock signals. The IC 400 includes a memory controller 410 and a memory system 450 having a first memory chip 460 and a second memory chip 470. The memory controller 410 is configured to retrieve data from the memory system 450 for processing and send data to the memory system 450 for storage. The memory controller 410 can be, or function similarly as, the memory controller 110 as in FIG. 1. Accordingly, the memory controller 410 can include a clock generator, a processor, a write clock controller, and a data controller. As with the memory controller 110, the memory controller 410 can be a SOC such as a Tegra® processor that includes a CPU. The memory controller 410 can also be another type of an electronic component or integrated circuit that has memory interfaces but lacks a CPU. Some examples include an integrated circuit such as an ASIC and a FPGA.

As noted above, the memory system 450 includes the first memory chip 460 and the second memory chip 470. The first memory chip 460 and the second memory chip 470 can be in different memory packages. Additionally, the memory controller 410 can be communicatively coupled to multiple memory packages. The memory system 450 can be a memory package, such as a DRAM memory package wherein the first and second memory chips 460, 470, can be DRAM ranks. As with memory system 150 of FIG. 1, in various embodiments the memory system 450 can be a DDR or a LPDDR, such as a fifth generation LPDDR.

The first memory chip 460 and the second memory chip 470 include data pins that are coupled to data busses from the memory controller 410. The first memory chip 460 and the second memory chip 470 also have pins that receive a write clock signal and the operational clock signal. In contrast to the memory system 150, the first memory chip 460 and the second memory chip 470 of memory system 450 receive both the write clock true signal (WCKT) from the memory controller 410 and the write clock complement signal (WCKC) from the memory controller 410. The first and second memory chips 460 and 470 include logic circuitry that can be configured to use the received WCKT and WCKC as a differential clock signal or as single ended signals such as used in the first and second memory chips 160, 170. Thus, the memory chips 460, 470, can receive both write clock signals and operate employing a write clock signal as a differential signal or as two single ended signals depending on the configuration.

The above-described apparatuses, systems or methods or at least a portion thereof may be embodied in or performed by various processors, such as digital data processors or computers, wherein the processors are programmed or store executable programs or sequences of software instructions to perform one or more of the steps of the methods or functions of the apparatuses or systems. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system described herein.

Certain embodiments disclosed herein may further relate to computer storage products with a non-transitory computer-readable medium that have program code thereon for performing various computer-implemented operations that embody at least part of the apparatuses, the systems or carry out or direct at least some of the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A method of operating a memory having multiple memory chips, comprising:
    employing a differential write clock signal as two single ended clock signals that are a first write clock signal and a second write clock signal;
    controlling read and write operations of a first memory chip of the memory employing the first write clock signal; and
    controlling, independently from the controlling of the first memory chip, read and write operations of a second memory chip of the memory employing the second write clock signal;
    wherein an access time between a first burst resulting from a read or write operation of the first memory chip and a second burst resulting from a read or write operation of the second memory chip is reduced based on a property of the first and second memory chips.

2. The method as recited in claim 1 further comprising switching a read or write operation from the first memory chip to the second memory chip.

3. The method as recited in claim 2 wherein the switching includes synching the second write clock signal by sending a preamble signal while a read or write operation is in progress on the first memory chip.

4. The method as recited in claim 2 wherein the switching includes levelling of the first memory chip and the second memory chip.

5. The method as recited in claim 3 wherein the preamble signal is a multi-cycle pattern and is incompatible on a bus with the first or second write clock signal.

6. The method as recited in claim 3 wherein the switching further includes sending a postamble signal with the first write clock signal while sending the preamble signal.

7. The method as recited in claim 3 wherein the switching begins after completion of the preamble.

8. The method as recited in claim 1 wherein the access time is reduced to two cycles of the first or second write clock signal.

9. The method as recited in claim 1 wherein the property is a manufacturing or process variation of the first and second memory chips.

10. The method as recited in claim 1 further comprising levelling the first single ended clock signal for the first memory chip independently from levelling the second single ended clock signal for the second memory chip.

11. The method as recited in claim 1 wherein the memory includes a memory package having the first memory chip and the second memory chip.

12. The method as recited in claim 11 wherein the first and the second memory chips are each a dynamic random access memory (DRAM) rank.

13. The method as recited in claim 11 wherein the memory package is a double data rate (DDR) DRAM.

14. The method as recited in claim 11 wherein the memory package is a fifth generation low power DDR (LPDDR) DRAM.

15. The method as recited in claim 11 wherein the memory package has a shared command bus for communicating commands and shared data busses to both the first and the second memory chips.

16. The method as recited in claim 1 wherein the first and second memory chips further receive an operational clock signal that is at a lower frequency than the first and second write clock signals.

17. The method as recited in claim 1 further comprising assigning the first single ended clock signal to the first memory chip and the second single ended clock signal to the second memory chip.

18. The method as recited in claim 1 wherein the first single ended clock signal and the second single ended clock signal are true and complement signals of the differential write clock signal.

19. An integrated circuit, comprising:
    a double data rate (DDR) dynamic random access memory (DRAM) including a first memory rank and a second memory rank that share a bus for commands and share other buses for communicating data; and
    a memory controller configured to independently control read and write operations of the first memory rank and the second memory rank employing a true signal and a complement signal of a differential write clock signal as single ended clock signals;
    wherein an access time between a first burst resulting from a read or write operation of the first memory rank and a second burst resulting from a read or write operation of the second memory rank is reduced based on a property of the first and second memory ranks.

20. The integrated circuit of claim 19 wherein the DDR is a low power DDR (LPDDR) DRAM.

* * * * *